United States Patent [19]

Fusi

[11] Patent Number: 5,582,378
[45] Date of Patent: Dec. 10, 1996

[54] EXTENSIBLE DEVICE FOR SUPPORTING OBJECTS, ESPECIALLY ILLUMINATION DEVICES AS IN PHOTOGRAPHIC STUDIOS AND THE LIKE

[75] Inventor: Giuliano Fusi, Firenze, Italy

[73] Assignee: Industria Fototecnica Firenze S.r.l., Firenze, Italy

[21] Appl. No.: 317,885

[22] Filed: Oct. 4, 1994

[30] Foreign Application Priority Data

Oct. 6, 1993 [IT] Italy .................. FI930109 U

[51] Int. Cl.$^6$ ................................. E04G 3/00
[52] U.S. Cl. .................. 248/277.1; 242/381; 248/330.1; 248/337; 248/338
[58] Field of Search ................... 248/323, 324, 248/325, 326, 327, 328, 329, 330.1, 336, 337, 338, 277.1, 157, 579; 188/71.2, 82.7, 82.74; 242/381, 381.3, 381.4

[56] References Cited

U.S. PATENT DOCUMENTS

| 400,856 | 4/1889 | Kintz ................... 248/330.1 |
| 1,501,524 | 7/1924 | Cousins . | |
| 3,672,104 | 6/1972 | Luckey ................. 248/277 X |
| 4,300,732 | 11/1981 | Gaeta .................. 248/330.1 X |
| 4,437,624 | 3/1984 | Rosenberg ............... 242/381 |

FOREIGN PATENT DOCUMENTS

| 458666 | 10/1913 | France . | |
| 135471 | 10/1971 | Japan .................. 248/579 |
| 1160668 | 8/1969 | United Kingdom . | |
| 2083433 | 3/1982 | United Kingdom . | |

OTHER PUBLICATIONS

Copy of European Search Report dated Jan. 6, 1995.

*Primary Examiner*—Ramon O. Ramirez
*Assistant Examiner*—Derek J. Berger
*Attorney, Agent, or Firm*—McGlew and Tuttle, P.C.

[57] ABSTRACT

A structure composed of articulated rods extending between a fixed attachment point and a free attachment point for the object to be supported. This structure is extensible in the direction of the straight line joining the fixed attachment point and the free attachment point, and is symmetrical about this line and more or less rigid in directions perpendicular to the direction of extension. The spool rotates about a pin inserted in said structure at a point close to the free attachment point. A cord is connected to a spring for winding up the cord. The cord has one end fixed to said structure close to said line at a point between the fixed attachment point and the spool. The other end of the cord is fixed to the circumference of the spool.

8 Claims, 4 Drawing Sheets

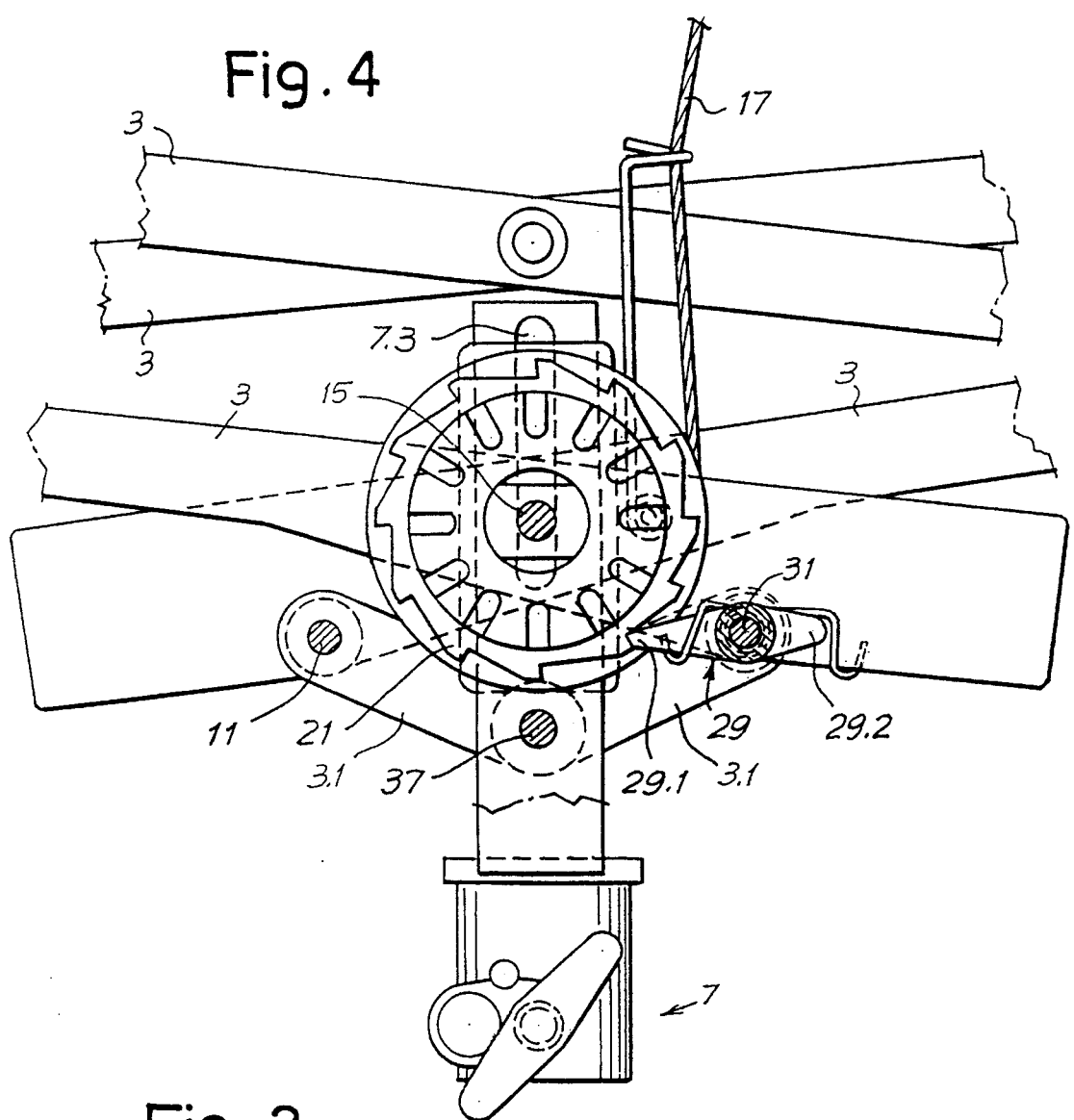
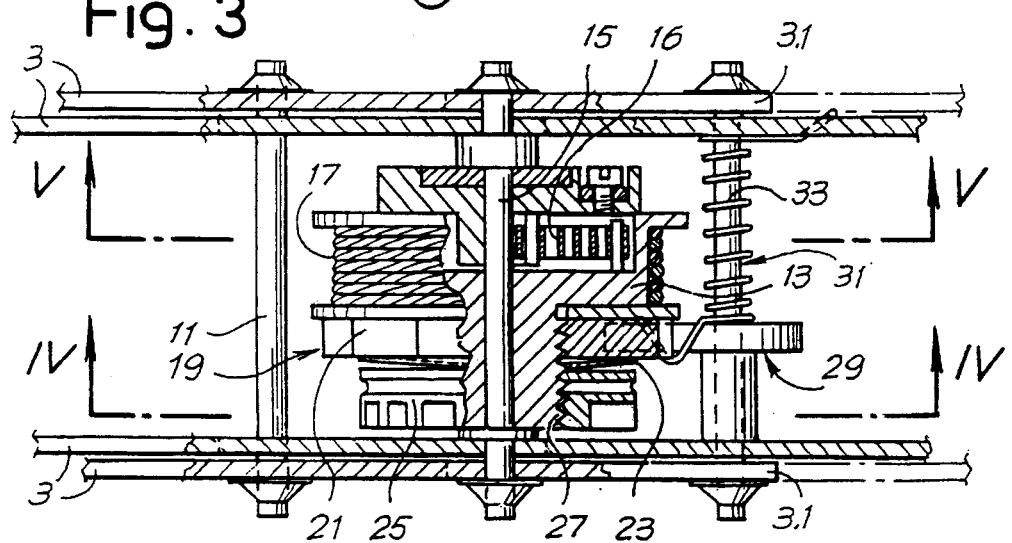

EXTENSIBLE DEVICE FOR SUPPORTING OBJECTS, ESPECIALLY ILLUMINATION DEVICES AS IN PHOTOGRAPHIC STUDIOS AND THE LIKE

FIELD OF THE INVENTION

The present invention relates to an extensible device for supporting objects, with special features making it both practical and easy to use, especially for illumination devices as in photographic studios and the like.

The present invention further relates to a device from which objects, such as spotlights or other means of illumination, may be hung. It is of the kind that comprises a pantograph system of articulated rods linking together two attachment points, one of which is designed to support the object and the other to connect the device to a supporting structure, typically an overhead structure.

BACKGROUND OF THE INVENTION

These devices have means for balancing the weight of the suspended object and enabling the articulated rod system to be lengthened or shortened. These means currently consist (in the smaller types of systems) of one or two leaf springs that provide an approximately constant load independently of how much the system may be extended and that are spiral-wound. These springs have many drawbacks, including:

the risk of sudden breakage when the spring is under tension. This can cause very serious harm and permanent injury to anyone near the device;

the difficulty of adjusting the load of the spring to suit the weight of the object hanging from the device. In order to make adjustments, the spring has to be dismantled from the articulated rod system;

the articulated rod system contracts suddenly under the spring loading whenever the object it is supporting is removed.

SUMMARY AND OBJECTS OF THE INVENTIONS

The object of the present invention is to provide a device of the kind outlined above which will overcome these drawbacks and be safe and practical in use.

In practice, in an advantageous embodiment, the device comprises in combination: a structure composed of articulated rods extending between a fixed attachment point and a free attachment point for the object to be supported. This structure is extendable in the direction of the straight line joining the fixed attachment point and the free attachment point. This structure is also symmetrical about this line and substantially rigid in directions perpendicular to the direction of extension. The device also comprises a spool rotating about a pin inserted in said structure at a point close to the free attachment point, connected to spring means for winding up a cord; said cord has one end fixed to said structure close to said line at a point between the fixed attachment point and the spool, and the other end fixed to the circumference of the spool.

Extending said structure draws out said cord from the spool, the drawing out being opposed by means which adjustably brake the rotation of the spool only. In the direction of unwinding of the cord; in this way said brake means oppose the component of the weight of the structure and of the object to be supported in the direction of extension of the structure, making it possible to balance said total weight and to keep the supported object at the desired distance from the fixed point. The free turning of which spool in the opposite direction together with the winding up of the cord onto the spool results in the structure moving in the opposite direction to that of extension with no extra load other than that of the total weight of the structure and object and of the friction between the moving parts of said structure.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 shows a section through the line III—III marked in FIG. 1; and

FIGS. 4 and 5 show sections through IV—IV and V—V marked in FIG. 3.

DETAILED DESCRIPTION OF THE PREFERRED EMBODIMENT

Figure 1:
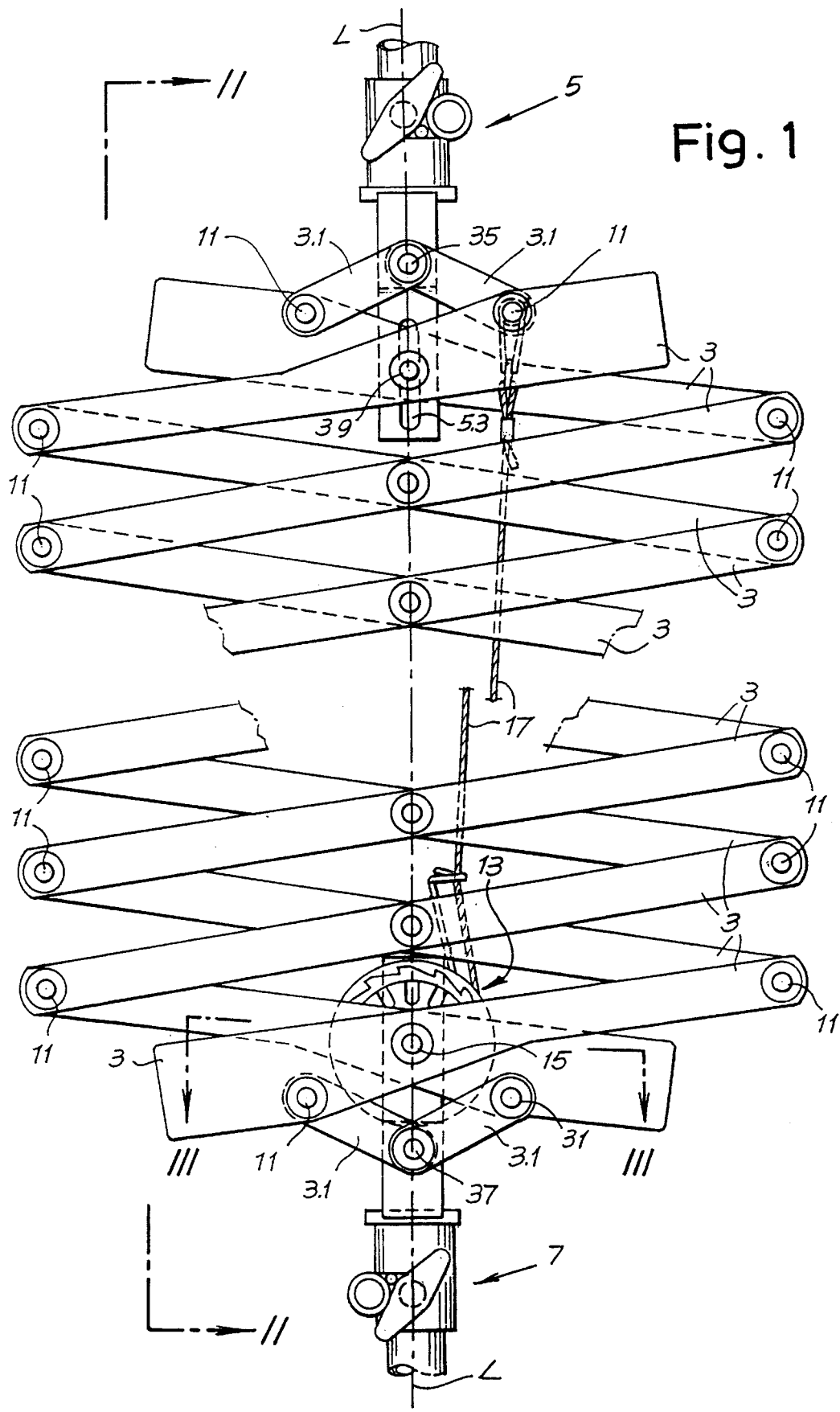
FIG. 1 shows a side elevation of the supporting device.
Figure 2:
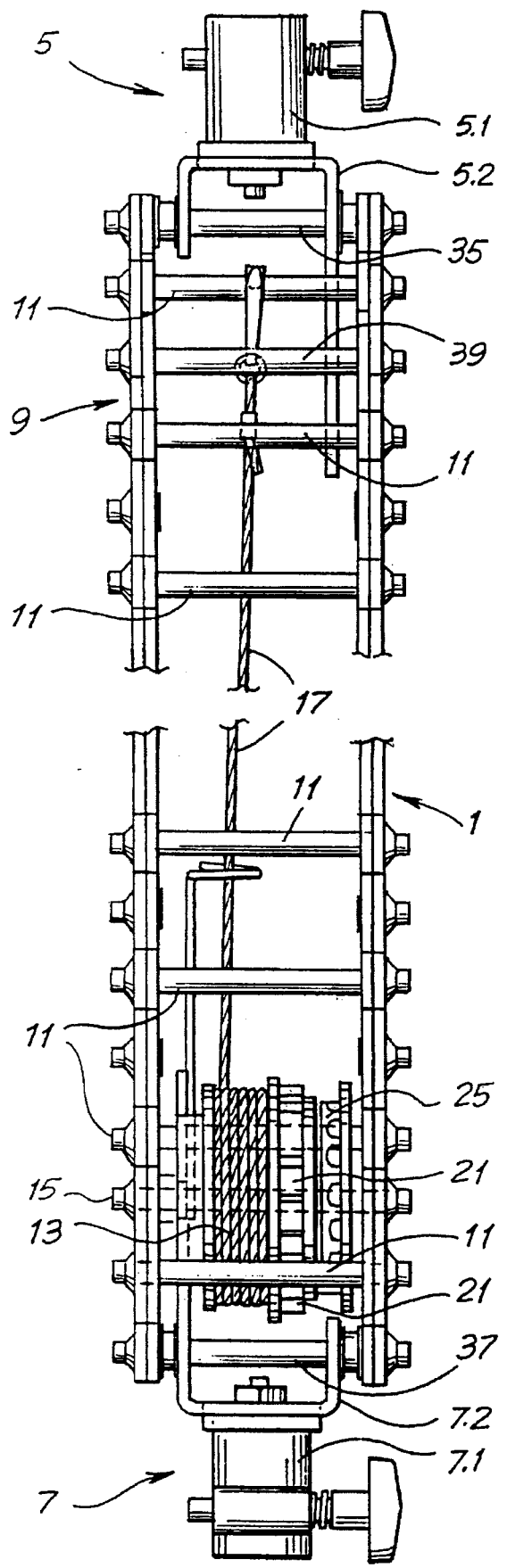
FIG. 2 shows another side elevation of the supporting device viewed through the line II—II marked in FIG. 1.

As shown in FIGS. 1 and 2, the device comprises: a first series (1) of rods (3) hinged together to form a succession of deformable parallelograms extending along the straight line (L—L) joining a fixed attachment point (5) and a free attachment point (7). Each rod 3 forming part of two adjacent parallelograms, except for rods (3.1) at the beginning and end of the series. A second series (9) of hinged rods are identical to the first series (1) and are facing the latter. The two series have in common at least the outermost hinge pins (11) of said rods (3), so that the assembly has sufficient transverse rigidity.

Figure 5:
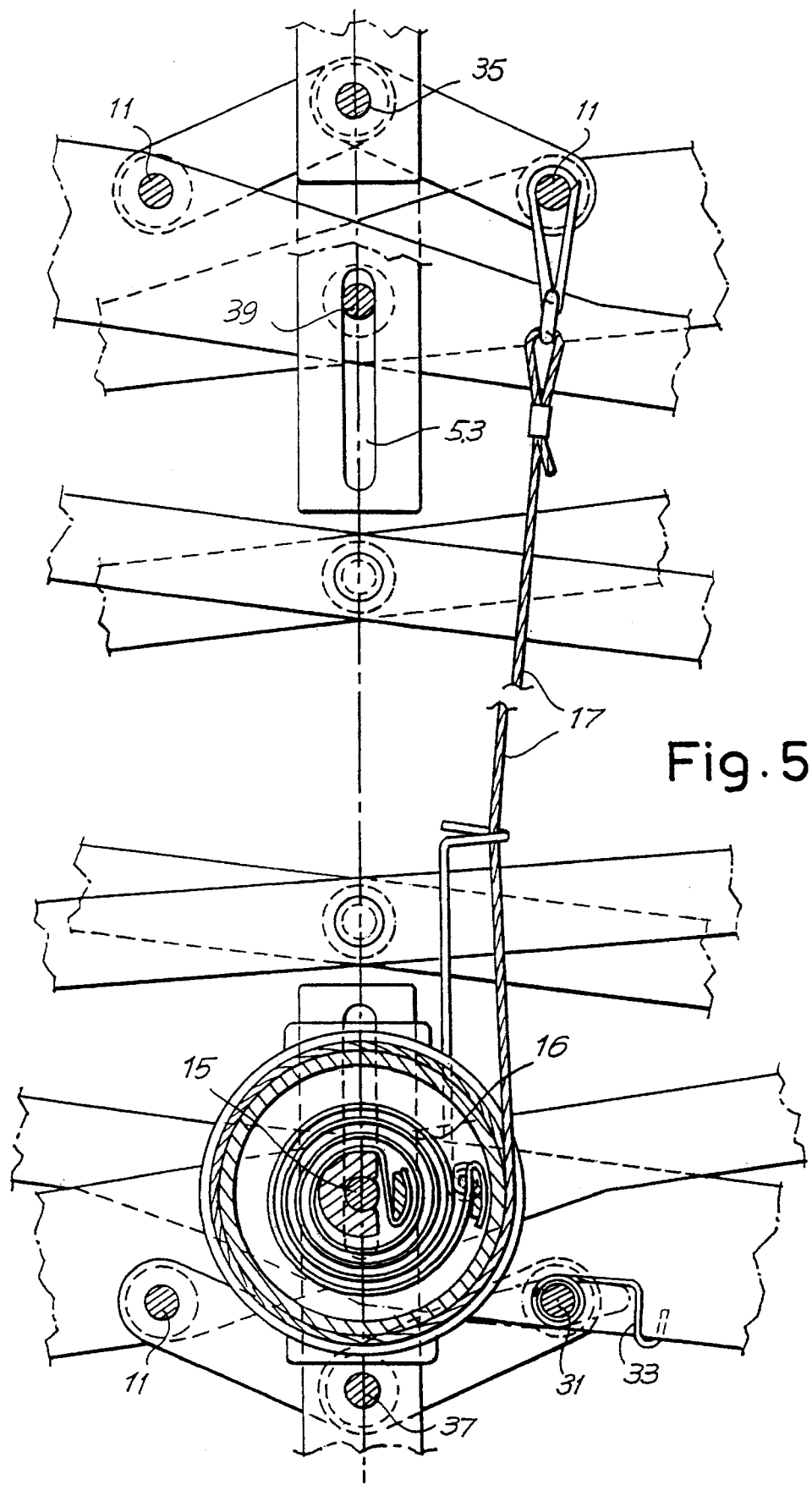

The device also comprises a spool (13) which rotates about a pin (15) (FIGS. 3, 4 and 5). The pin 15 is inserted into said rod structure at a point close to the free attachment point (7). The spool (13) has a spiral spring (16) for the purposes of winding up a cord (17). Said cord has one end fixed to the rod structure close to said line (L—L) at a point between the fixed attachment point (5) and the spool (13), and the other end fixed to the circumference of the spool (13). Extending said rod structure draws out said cord (17) from the spool (13).

The drawing out of the cord (17) from the spool (13) is opposed by means (19) which only adjustably brakes the rotation of the spool (13) in the direction of unwinding of the cord. In this way said brake means (19) oppose the weight component of the rod structure and of the object to be supported, in the direction of extension of the structure. This is done in order to make it possible to balance said total weight and to keep the supported object at the desired distance from the fixed attachment point (5). The free turning of the spool in the opposite direction together with the winding up of the cord (17) onto the spool (13), results in the rod structure moving in the opposite direction to that of extension with no extra load other than that of the total weight of the structure and object and of the friction between the moving parts of said structure.

Said means (19) for opposing the free turning of the spool (13) in the unwinding direction of the cord (17) comprises a ratchet mechanism with a toothed wheel (21) mounted coaxially on the spool (13). The toothed wheel is pressed axially against the spool by a Belleville washer (23) with a force that can be adjusted by means of a nut (25) screwed onto a threaded seat or shaft (27) integral and coaxial with the spool (13). This creates an adjustable frictional torque between the toothed wheel (21) and the spool (13). A pawl (29) is mounted on a pin (31) that links together two rods carrying the pin (15) of the spool (13). Said pawl (29) is acted on by a spring (33) so that one end (29.1) of the pawl is introduced between the teeth of the toothed wheel (21), thereby preventing the toothed wheel 21 from rotating only in the direction of unwinding of the cord (17), while the other end (29.2) can be grasped manually to disengage the pawl (29) when it is wished to extend the supporting device without having to overcome the friction of the brake.

The fixed and free attachment points (5, 7) each comprise a sleeve (5.1, 7.1) fitted with a wing nut for manually fastening the attachment point of the supporting device to a fixed rod or to the object to be supported by the supporting device. Each of said sleeves (5.1, 7.1) is firmly fixed to a U bracket (5.2, 7.2) in which one of the two arms of the U is extended and contains a slot (5.3, 7.3). Said U brackets (5.2, 7.2) are hinged by a pin (35, 37) to the free end of the last rods (3.1) of the two series (1, 9) of rods forming said structure. By means of said slots (5.3, 7.3) the first is guided on one of the rod structure pins (39) located on the axis of symmetry of said structure and the second is guided on the pin (15) of the spool (13) in such a way as to keep the sleeves (5.1, 7.1) lined up with each other however far the supporting device is extended.

I claim:

1. An extensible device comprising:

first and second pantograph series of articulated rods, said first and second series of articulated rods being positioned opposite and parallel, ends of said first and second series of articulated rods including attachment points;

a pin connected to one of said articulated rods of each of said first and second series;

balancing means including a spool mounted on said pin and a cord having one end wound around said spool and another end fastened to one of said first and second series of articulated rods, said cord being windable and unwindable from said spool, said balancing means also including an adjustable brake means.

2. A device in accordance with claim 1, wherein:

said first and second series of articulated rods include means for extending in a direction of a line formed by said attachment points;

said first and second series of articulated rods are substantially symmetrical about said line;

said first and second series of articulated rods include means for holding said first and second series of articulated rods substantially rigid in directions perpendicular to said line;

said spool is rotatable about said pin;

said pin is positioned adjacent one of said attachment points;

said spool including spring means for winding said cord;

said another end of said cord is fixed to said articulated rods at a point adjacent said line and adjacent another one of said attachment points;

means for drawing out said cord from said spool when said first and second series of articulated rods are extended;

said brake means adjustably braking rotation of said spool during extension of said first and second series of articulated rods to oppose extension of said first and second series of articulated rods, said brake means causing said spool to free turn during winding of said cord and retraction of said first and second series of articulated rods, the free turning applying no extra load to retraction of said first and second series of articulated rods.

3. A device in accordance with claim 2, wherein:

said adjustable brake means includes a ratchet mechanism with a toothed wheel mounted coaxially on said spool, said ratchet mechanism including a Belleville washer pressed axially against the toothed wheel and pressing the toothed wheel axially against the spool;

said ratchet mechanism also including a nut screwed onto a threaded seat of said spool to adjust a force of said Belleville washer, said nut, said Belleville washer, said toothed wheel and said spool creating an adjustable frictional torque between said toothed wheel and said spool, said ratchet mechanism including a pawl mounted on one of a pair of said articulated rods connected to said pin, said ratchet mechanisms also including a spring acting on said pawl to cause one end of said pawl to be movable between teeth of said toothed wheel to prevent said toothed wheel from rotating in a direction causing said cord to unwind from said spool.

4. A device in accordance with claim 3, wherein:

another end of said pawl extends to be grasped manually to disengage said pawl from said toothed wheel during extension of said first and second series of articulated rods and to nullify friction caused by said brake means.

5. A device in accordance with claim 1, wherein:

said spool defines a recessed seat;

a spiral spring is positioned in said recessed seat, an inner end of said spiral spring being attached to said pin, an outer end of said spiral spring being attached to said spool;

a threaded seat positioned oh a side of said spool opposite said recessed seat, said threaded seat being coaxial with said spool;

a ratchet-type arresting mechanism including a toothed wheel mounted on said threaded seat and a nut screwed onto said threaded seat, said toothed wheel being positioned between said spool and said nut, said ratchet-type arresting mechanism also including elastic means positioned between said nut and said toothed wheel.

6. A device in accordance with claim 5, wherein:

said elastic means includes a Belleville washer.

7. A device in accordance with claim 1, wherein:

said articulated rods in each of said first and second series are separately hinged together to form a succession of deformable parallelograms extending along a line connecting said attachment points, each rod, except end rods, forming part of two adjacent parallelograms;

said first and second series of articulated rods having in common outermost hinge pins causing transverse rigidity.

8. A device in accordance with claim 7, wherein:

said attachment points each include a sleeve fitted with a wing-nut for manually fastening said attachment points to one of a fixed rod and an object to be supported, said attachment points also including separate U-brackets fixed to respect said sleeves;

one of the two arms of each of the U-brackets defines a slot, said U-brackets being hinged by a last rod pin to a free end of end rods of said first and second series of articulated rods, said pin supporting said spool being one of said last rod pins, said slots causing said sleeves to be lined with each other over a full travel of said first and second series of articulated rods.

* * * * *